3,269,960
CURING A POLYEPOXIDE RESIN WITH AN ORGANODIBORON COMPOUND
William David English, Orange, and Irving S. Bengelsdorf, Tustin, Calif., assignors to United States Borax & Chemical Corporation, Los Angeles, Calif., a corporation of Nevada
No Drawing. Filed Dec. 14, 1964, Ser. No. 418,275
13 Claims. (Cl. 260—2)

This application is a continuation-in-part of our copending application Serial No. 97,149 filed March 21, 1961, now abandoned.

The present invention relates as indicated to cured polyepoxide resin compositions and has more particular reference to compositions comprising a reactive polyepoxide and an organodiboron curing agent.

It is, therefore, the principal object of this invention to provide new compositions comprising a reactive polyepoxide and an organodiboron compound.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises a composition comprising a reactive polyepoxide having more than one epoxy group per molecule and from about 2% to about 50%, based on the weight of said reactive polyepoxide, of an organodiboron curing agent, said curing agent selected from the group consisting of

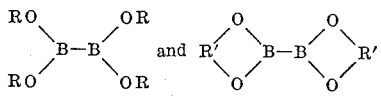

where R is a material selected from the group consisting of hydrogen, unsubstituted saturated aliphatic hydrocarbon radicals of from 1 to 20 carbon atoms, unsubstituted saturated cycloaliphatic hydrocarbon radicals of from 6 to 12 carbon atoms, substituted saturated aliphatic hydrocarbon radicals of from 1 to 6 carbon atoms having aromatic hydrocarbon substituents, unsubstituted aromatic hydrocarbon radicals and substituted aromatic hydrocarbon radicals having unsubstituted saturated aliphatic hydrocarbon substituents of from 1 to 12 carbon atoms and R' is selected from the group consisting of unsubstituted alkylene radicals of from 2 to 3 carbon atoms in length, substituted alkylene radicals of from 2 to 3 carbon atoms in length having aliphatic hydrocarbon substituents, substituted alkylene radicals of from 2 to 3 carbon atoms in length having aromatic hydrocarbon substituents, unsubstituted o-phenylene radicals and substituted o-phenylene radicals having aliphatic hydrocarbon substituents.

The reactive polyepoxides applicable to the present invention are compounds or mixtures of compounds, the average molecule of which contains more than one 1,2-epoxy groups,

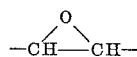

arranged in either one or more open chain or cyclic structures. Owing to the methods for preparing the reactive polyepoxides and the fact that they are sometimes a mixture of chemical compounds having different structures, and containing some groups which are not converted to 1,2-epoxy groups, the number of epoxy groups in an average molecule of the product is not necessarily a whole number. However, in all instances the number of epoxy groups much be greater than one.

There are four major classes of reactive polyepoxides. These are:

(1) Glycidyl polyethers—derived from dihydric phenols such as bisphenol A, or derived from polyhydric phenols such as phenol-formaldehyde condensation products, or derived from polyols such as glycol and glycerol.

(2) Epoxidized unsaturated glycerides and abietic acid derivatives—such as epoxidized soybean oil, linseed oil and tall oil.

(3) Epoxidized polyolefins—such as epoxidized polybutadiene and polyisoprene.

(4) Epoxidized cyclopolyolefins—such as epoxidized dicyclopentadiene, vinylcyclohexene and other Diels-Alder reaction products.

Numerous examples of such reactive epoxy compositions and the preparation thereof are found in Lee et al., "Epoxy Resins," McGraw-Hill Book Company, Inc. (1957), Chapter 1, pages 3–29.

It is to be clearly understood that the term "reactive polyepoxide" as used in the present specification and appended claims is intended to include all reactive polyepoxides having more than one epoxy group per molecule, and the curing agents as defined in the foregoing broadly stated paragraph and discussed in more detail hereinafter are all applicable to all such reactive polyepoxides.

To produce a desirable end product, a cured polyepoxide resin, the reactive polyepoxide and curing agent used must be compatible, that is they must be miscible one with the other at room temperature or at an elevated temperature, prior to the cure, and they must not separate while curing so that a uniform product is obtained. The organodiboron curing agents of the present invention fulfill these requirements.

The following list is illustrative of the organodiboron compounds applicable to the present invention:

tetrahydroxydiboron
tetramethoxydiboron
tetraethoxydiboron
tetraisopropoxydiboron
tetranonoxydiboron
tetra-n-octadecyloxydiboron
tetracyclohexyloxydiboron
tetracycloheptyloxydiboron
tetra(3-phenyl-n-propoxy)diboron
tetraphenoxydiboron
tetra-1-naphthoxydiboron
tetra-2-methylphenoxydiboron
tetra-2,4-dibutylphenoxydiboron
2-(1,3,2-benzodioxaborolo)-1,3,2-benzodioxaborole
2-(1,3,2-dioxaborolo)-1,3,2-dioxaborolane
2-(1,3,2-dioxaborinyl)-1,3,2-dioxaborinane
2-(4,5-diethyl-1,3,2-dioxaborolo)-4,5-diethyl-1,3,2-dioxaborolane
2-(5-phenyl-1,3,2-dioxaborinyl)-4-phenyl-1,3,2-dioxaborinane
2-(6-ethyl-1,3,2-benzodioxaborolo)-6-ethyl-1,3,2-benzodioxaborole It is to be clearly understood that the foregoing list is only a partial enumeration of the organodiboron curing agents applicable to the present invention, and is not intended to limit the invention.

Tetrahydroxydiboron can be prepared by the reaction of diboron tetrachloride with water at room temperature according to the procedure of Wartik and Apple, J. Amer. Chem. Soc. 80, 6155–58 (1958).

So that the present invention can be more clearly understood, the following examples are given for illustrative purposes:

*Example I*

Tetrahydroxydiboron and a glycidyl polyether were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 8 days while the heated portion cured to a foamed resin in 10 hours.

*Example II*

Tetrahydroxydiboron and an epoxidized cyclopolyolefin were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature became gelatinous after 6 days while the heated portion cured to a foamed resin in 6 hours.

*Example III*

Tetraethoxydiboron and an epoxidized polyolefin were thoroughly mixed together in an amount equivalent to 8 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed a slight increase in viscosity after 2 weeks and the heated portion cured in 14 hours.

*Example IV*

Tetraethoxydiboron and an epoxidized unsaturated glyceride were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed an increased viscosity after 2 weeks and the heated portion cured to a soft flexible resin in 24 hours which on heating to 150° C. for 4.5 hours set to a hard resin.

*Example V*

Tetraphenoxydiboron and an epoxidized cyclopolyolefin were thoroughly mixed together in an amount equivalent to 10 parts of the diboron per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 2 weeks and the heated portion was still liquid after 18 hours. On cooling the heated portion set to a solid flexible resin, which remelted on heating and when post-cured at 150° C. for 23 hours set to a hard resin.

*Example VI*

Tetraphenoxydiboron and an epoxidized unsaturated glyceride were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 2 weeks and the heated portion cured in 10 hours.

*Example VII*

Tetra-2-methylphenoxydiboron and a glycidyl polyether were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed an increased viscosity after 2 weeks while the heated portion cured to a soft flexible resin after 12 hours. Post-curing the soft flexible resin for 6 hours at 150° C. resulted in a very hard resin.

*Example VIII*

Tetra-2-methylphenoxydiboron and an epoxidized unsaturated glyceride were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 2 weeks while the heated portion cured in 10 hours.

*Example IX*

Tetra-1-naphthoxydiboron and an epoxidized cyclopolyolefin were thoroughly mixed together in an amount equivalent to 40 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature became gelatinous after 4 days while the heated portion cured in 3.5 hours.

*Example X*

Tetra-1-naphthoxydiboron and an epoxidized polyolefin were thoroughly mixed together in an amount equivalent to 15 parts of the diboron per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 2 weeks and the heated portion was liquid after 12 hours. On cooling, the heated portion set to a flexible resin which could be remelted and which on heating to 150° C. for 5 hours cured to a very hard resin.

*Example XI*

Tetracyclohexyloxydiboron and an epoxidized cyclopolyolefin were thoroughly mixed together in an amount equivalent to 20 parts of the diboron per 100 parts of the reactive polyepoxide by weight. The admixture was then divided into two portions, each portion being placed in a disposable Petri dish. One portion was placed in an oven heated to 150° C. while the other portion was kept at room temperature. The portion kept at room temperature showed a slight increase in viscosity after 2 weeks while the heated portion cured in 7 hours.

*Example XII*

Tetracycloheptyloxydiboron and a glycidyl polyether were thoroughly mixed together in an amount equivalent to 20 parts of the diboron per 100 parts of the reactive polyepoxide by weight. The admixture was then divided into two portions, each portion being placed in a disposable Petri dish. One portion was placed in an oven heated to 150° C. while the other portion was kept at room temperature. The portion kept at room temperature showed no cure after 2 weeks while the heated portion cured in 9 hours.

*Example XIII*

2-(1,3,2-dioxaborolo)-1,3,2-dioxaborolane and an epoxidized unsaturated glyceride were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 2 weeks while the heated portion cured in 5 hours.

*Example XIV*

2-(4,5-diethyl-1,3,2-dioxaborolo) - 4,5-diethyl-1,3,2-dioxaborolane and an epoxidized polyolefin were thoroughly mixed together in an amount equivalent to 12 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 2 weeks while the heated portion cured in 7 hours.

*Example XV*

2-(1,3,2 - benzodioxaborolo) - 1,3,2 - benzodioxaborole and an epoxidized polyolefin were thoroughly mixed together in an amount equivalent to 40 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature became a tacky solid in 6 days while the heated portion cured in 3 hours.

*Example XVI*

2-(6-ethyl-1,3,2-benzodioxaborolo) - 6-ethyl-1,3,2-benzodioxaborole and an epoxidized cyclopolyolefin were thoroughly mixed together in an amount equivalent to 10 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 2 weeks while the heated portion cured in 5.5 hours.

*Example XVII*

2-(1,3,2-dioxaborinyl)-1,3,2-dioxaborinane and an epoxidized unsaturated glyceride were thoroughly mixed together in an amount equivalent to 20 parts of the diboron per 100 parts of the reactive polyepoxide by weight. The admixture was then divided into two portions, each portion being placed in a disposable Petri dish. One portion was kept at room temperature while the other portion was placed in an oven heated to 150° C. The portion kept at room temperature showed no cure after 2 weeks while the heated portion cured in 12 hours.

*Example XVIII*

2 - (5 - phenyl - 1,3,2 - dioxaborinyl) - 5 - phenyl - 1, 3,2-dioxaborinane and a glycidyl polyether were thoroughly mixed together in an amount equivalent to 10 parts of the diboron per 100 parts of the reactive polyepoxide by weight. The admixture was then divided into two portions, each portion being placed in a disposable Petri dish. One portion was kept at room temperature while the other portion was placed in an oven heated to 100° C. The portion kept at room temperature showed no cure after 2 weeks and the heated portion was still liquid after 10 hours. On cooling, the heated portion set to a soft pliable resin which remelted on heating and when placed in an oven at 150° C. cured after 12 hours.

From the foregoing examples it will be seen that the organodiboron compounds as described previously when admixed with any class of reactive polyepoxide will result in cured polyepoxide resin compositions. We have found that from about 2% to about 50%, based on the weight of the reactive polyepoxide, of the organodiboron curing agent will induce curing and result in superior cured epoxy resin compositions.

It is sometimes desirable to add other materials to the resin compositions in order to impart certain specific characteristics. It will be found that such additives do not interfere with the action of the present curing agents. Reinforcing materials such as glass, mineral and metal fibers add strength and decrease shrinkage when the composition is cured, inert granular materials such as mica, asbestos and iron oxide lower the overall cost of the finished products, thixotropic agents such as bentonite and specially prepared silicas thicken epoxy compositions so that they can be applied to vertical surfaces and cured in place, and coloring agents such as titanium dioxide, cadmium yellows and organic dyestuffs overcome the amber color usually associated with cured epoxy resin compositions. These and other similar materials known to the art can be used in combination with the present curing agents to produce cured epoxy resin compositions.

The rate of cure, the curing temperature and the primary properties of the cured polyepoxide resin compositions are determined by the specific reactive polyepoxide or combination of reactive polyepoxides used, the particular organodiboron used and the amount of such organodiborons. Polyepoxide resins cured with the present curing agents are highly resistant to chemical attack, show a low moisture permeability and have excellent adhesive qualities. Many other properties such as hardness, high yield and tensile strength, electrical insulating, heat resistance, shear resistance, flexibility and wear resistance can be endowed the cured polyepoxide resin compositions by changing any one or any combination of the above variables.

Due to the many superior properties of the cured polyepoxide resin compositions of the present invention, they will be found to have utility as protective coatings and sealing compounds because of their superior adhesive qualities, chemical inertness, high strength and low moisture permeability. They can be used in tools and dies and as structural components in the equipment and construction fields. They can be used as adhesives for bonding together metal, wood or other plastics. They have excellent insulation properties and the admixtures of reactive polyepoxides and organodiborons which have long pot lives and are liquids at room temperature will find outstanding use in the encapsulation and potting of electrical components.

Other modes of applying the principles of the invention may be employed, change being made as regards the details described, provided the features stated in any of the following claims or the equivalent of such be employed.

We, therefore, claim as our invention:

1. In the process for curing and hardening a reactive 1,2-epoxy compound having more than one epoxy group per molecule wherein said reactive 1,2-epoxy compound is mixed and reacted with a curing agent to form a hard, cured resin, the improvement which consists of employing as said curing agent from about 2% to about 50%, based on the weight of said reactive 1,2-epoxy compound, of a boron compound selected from the group consisting of

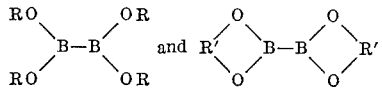

where R is selected from the group consisting of hydrogen, unsubstituted saturated aliphatic hydrocarbon radicals of from 1 to 20 carbon atoms, unsubstituted saturated cycloaliphatic hydrocarbon radicals of from 6 to about 7 carbon atoms, substituted saturated aliphatic hydrocarbon radicals of from 1 to 6 carbon atoms having aromatic hydrocarbon substituents, unsubstituted aromatic hydrocarbon radicals and substituted aromatic hydrocarbon radicals having unsubstituted saturated aliphatic hydrocarbon substituents of from 1 to 12 carbon atoms and R' is selected from the group consisting of unsubstituted alkylene radicals of from 2 to 3 carbon atoms in length, substituted alkylene radicals of from 2 to 3 carbon atoms in length having aliphatic hydrocarbon substituents, substituted alkylene radicals of from 2 to 3 carbon atoms in length having aromatic substituents, unsubstituted o-phenylene radical and substituted o-phenylene radical having aliphatic hydrocarbon substituents.

2. The process according to claim 1 in which said boron compound is tetramethoxydiboron.

3. The process according to claim 1 in which said boron compound is tetraethoxydiboron.

4. The process according to claim 1 in which said boron compound is tetraphenoxydiboron.

5. In the process for curing and hardening a reactive 1,2-epoxy compound having more than one epoxy group per molecule wherein said reactive 1,2-epoxy compound is mixed and reacted with a curing agent to form a hard, cured resin, the improvement which consists of employing as said curing agent from about 2% to about 50%, based on the weight of said reactive 1,2-epoxy compound, of tetrahydroxydiboron.

6. In the process for curing and hardening a reactive 1,2-epoxy compound having more than one epoxy group per molecule wherein said reactive 1,2-epoxy compound is mixed and reacted with a curing agent to form a hard, cured resin, the improvement which consists of employing as said curing agent from about 2% to about 50%, based on the weight of said reactive 1,2-epoxy compound, of a boron compound of the formula

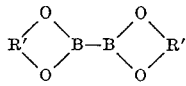

where R' is an alkylene radical of from 2 to 3 carbon atoms in length.

7. The process according to claim 6 in which said boron compound is 2(1,3,2-dioxaborolo)-1,3,2-dioxaborolane.

8. The process according to claim 6 in which said boron compound is 2-(1,3,2-dioxaborinyl)-1,3,2-dioxaborinane.

9. The process according to claim 6 in which said boron compound is 2-(4,5-diethyl-1,3,2-dioxaborolo)-4,5-diethyl-1,3,2-dioxaborolane.

10. The process according to claim 1 in which said boron compound is 2-(1,3,2-benzodioxaborolo)-1,3,2-benzodioxaborole.

11. The process according to claim 1 in which reactive 1,2-epoxy compound is reacted with said curing agent at an elevated temperature up to about 150° C.

12. The process according to claim 5 in which said reactive 1,2-epoxy compound is reacted with said tetrahydroxydiboron at an elevated temperature up to about 150° C.

13. The process according to claim 6 in which said reactive 1,2-epoxy compound is reacted with said boron compound at an elevated temperature up to about 150° C.

No references cited.

WILLIAM H. SHORT, *Primary Examiner.*

S. N. RICE, T. E. PERTILLA, *Assistant Examiners.*